United States Patent [19]

Billmers et al.

[11] Patent Number: 5,321,132

[45] Date of Patent: Jun. 14, 1994

[54] METHOD OF PREPARING INTERMEDIATE DS STARCH ESTERS IN AQUEOUS SOLUTION

[75] Inventors: Robert L. Billmers, Stockton; Martin M. Tessler, Edison, both of N.J.

[73] Assignee: National Starch and Chemical Investment Holding Corporation, Wilmington, Del.

[21] Appl. No.: 996,322

[22] Filed: Dec. 23, 1992

[51] Int. Cl.⁵ .................. C08B 31/02; C08B 33/02; C08B 35/02
[52] U.S. Cl. ................................. 536/48; 536/110
[58] Field of Search .................. 536/48, 110

[56] References Cited

U.S. PATENT DOCUMENTS 2,461,139  2/1949  Caldwell ........................ 536/110
3,839,320  10/1979  Bauer ............................. 536/110
3,891,624  6/1975  Boonstra et al. ............... 536/107

OTHER PUBLICATIONS

R. L. Whisler, J. N. BeMiller and E. F. Pschall, "Starch; Chemistry and Technology", Academic Press, 1984, pp. 332–343.

O. B. Wurzburg, "Methods in Carbohydrate Chemistry", 1964, 4, pp. 286–288.

*Primary Examiner*—Nathan M. Nutter
*Attorney, Agent, or Firm*—Eugene Zagarella, Jr.

[57] ABSTRACT

Starch esters having an intermediate DS of about 0.5 to 1.8 are prepared in an aqueous one step process by reacting starch with high treatment levels of organic acid anhydride and high concentrations of alkaline reagent.

22 Claims, No Drawings

METHOD OF PREPARING INTERMEDIATE DS STARCH ESTERS IN AQUEOUS SOLUTION

BACKGROUND OF THE INVENTION

This invention relates to a method of preparing starch esters having an intermediate DS of about 0.5 to 1.8 using a one step aqueous process with organic acid anhydrides.

The modification of starch by chemical derivatization and in particular the preparation of starch esters is well known in the art. Techniques used in preparing the starch esters have generally involved aqueous reactions for low DS starch esters and non-aqueous systems such as anhydrous pyridine for the high DS starch esters. A good review of the preparation of starch esters may be found in R. L. Whisler, J. N. BeMiller and E. F. Paschall, *Starch: Chemistry and Technology*, Academic Press, 1984, Chapter X. This reference teaches that low degree of substitution (DS) starch acetates can be made by the treatment of an aqueous starch suspension with acetic anhydride at pH of 7–11. The maximum degree of substitution obtainable without gelatinization varies with the particular starch, but the upper limit is about 0.5 DS. To reach this DS of 0.5, it is necessary to repeatedly increase reagent concentrations by filtering the starch from the reaction mixture, resuspending it in 1.25–1.5 parts of water per part of starch, and continuing the acetylation.

O. B. Wurzburg, *Methods in Carbohydrate Chemistry*, 1964, 4, 286–287, discloses that no more than 10.2 g (0.1 mole) of acetic anhydride for 162 g (1.0 mole) of starch, dry basis, should be used when reacting an aqueous slurry of starch with acetic anhydride because the efficiency of the reaction decreases with dilution. If a higher treatment is needed, the dilution effect can be offset by removing the excess water through filtration followed by resuspension of the starch in water. The treatment can be repeated using a second portion of acetic anhydride. Treatment with 0.1 mole of acetic anhydride yields a starch acetate with a DS of about 0.07. By repeated treatment, it is possible to make a starch acetate having a DS of 0.5. For higher degrees of substitution ranging up to 3.0 DS, pyridine is the preferred catalyst in the acetylation.

Specific methods of preparing starch esters in aqueous systems are shown in the following patents. U.S. Pat. No. 2,461,139 issued Feb. 8, 1949 to C. Caldwell discloses the reaction of starch with organic acid anhydrides in an aqueous alkaline medium. Using amounts of organic acid anhydride, based on the dry starch, of 0.1 to 5% is preferred, with quantities higher than 10% being less desirable. The preparation of low DS starch esters in water using magnesium oxide or magnesium hydroxide to control pH is disclosed in U.S. Pat. No. 3,839,320 issued Oct. 1, 1974 to C. Bauer.

Accordingly, while it is known to prepare starch esters using aqueous systems as described above, such methods have been limited to the preparation of low DS derivatives and even require multiple or repeated treatments because of the difficulties that result when using higher amounts of anhydride and alkaline reagents. Such difficulties are caused by the swelling or gelatinization of the starch and the inability to filter the starch from the reaction mixture, limiting the number of repeat reactions and ultimately the maximum DS in aqueous systems. Therefore, solvent systems such as pyridine have been the preferred reaction medium for the preparation of intermediate and high DS starch esters.

SUMMARY OF THE INVENTION

Now it has been surprisingly found that starch esters having an intermediate DS can be prepared in an aqueous one step process by reacting starch with high treatment levels of organic acid anhydrides and high concentrations of alkaline reagent. Starch reacted in this manner results in a product which becomes hydrophobic, i.e. water insoluble, as the DS goes up and can be recovered by filtration.

More particularly, this invention relates to a method of preparing starch esters having a DS of from about 0.5 to 1.8 in a one step aqueous procedure wherein from about 35 to 300% by weight of an organic acid anhydride, based on dry weight of starch, is reacted with starch in an aqueous alkaline medium having a pH of from about 7 to 11.

DETAILED DESCRIPTION OF THE INVENTION

The starch esters prepared by the method of this invention are ester compounds having 2 to 8 carbon atoms in the ester component. More particularly the starch esters comprise ester compounds having the formula:

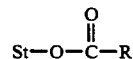

where St is the starch base material and R is an alkyl, aryl, alkenyl, alkaryl or aralkyl of 1 to 7, preferably 1 to 4 carbon atoms. More preferably the ester compound will have an R which is an alkyl group of 1 to 2 carbon atoms. Starch esters of this type include starch acetate, starch propionate, starch butyrate, starch hexanoate, starch benzoate and mixed starch esters, for example, starch acetate/propionate, i.e. where the ester has the formula:

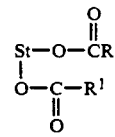

with R and $R^1$ representing different substituent groups as defined above.

The starch esters are prepared from the respective organic acid anhydride. That is, the anhydride will have the formula:

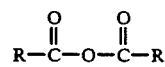

where R repesents the same groups as defined above for the starch ester. It is further noted that the anhydride may have different R groups, i.e., it would be a mixed anhydride.

The amount of anhydride that is reacted or treated with the starch to obtain the desired DS starches will be from about 35 to 300% by weight, based on the dry weight of starch, and preferably from about 50 to 200%.

The base starch material used herein may be any of several starches, native, converted or derivatized. Such starches include those derived from any plant source including corn, potato, sweet potato, wheat, rich, sago, tapioca, waxy maize, sorghum and high amylose starch such as high amylose corn, i.e., starch having at least 45% and more particularly at least 65% amylose content by weight, etc. Starch flours may also be used. Also included are the conversion products derived from any of the former bases, such as, for example, dextrins prepared by hydrolytic action or acid and/or heat; fluidity or thin boiling starches prepared by enzyme conversions or mild acid hydrolysis; oxidized starches prepared by treatment with oxidants such as sodium hypochlorite; and derivatized starches, such as cationic, anionic, amphoteric, non-ionic, and crosslinked. Stated differently, the starch material may comprise a granular or dispersed starch. By dispersed or non-granular starch is meant any starch which has had its structure disrupted or removed, i.e. is destructurized, by either thermal (jet cooking, boiling water bath), mechanical (drum drying, spray drying, extrusion), or chemical (use of liquid ammonia, dextrinization, subject to high levels of caustic) means.

Any alkali material may be used as the alkali reagent or alkaline medium in the process of this invention. Particularly useful alkali materials are the alkali metal hydroxides and alkaline earth metal hydroxides or the Group IA or IIA hydroxides, oxides, carbonates, or other salts. Illustrative alkali materials are sodium hydroxide, potassium hydroxide, calcium hydroxide, ammonium hydroxide, magnesium hydroxide, sodium carbonate and trisodium phosphate. Preferred alkalis are the alkali metal hydroxides and most preferred is sodium hydroxide.

The amount and concentration of alkali material will be sufficient to maintain the pH of the aqueous reaction mixture at from about 7 to 11. Because of the high amount of anhydride needed to prepare the selected esters having a DS of 0.5 to 1.8, it is desirable to use a concentrated amount of aqueous alkali of about 10 to 50% and preferably about 20 to 30% by weight.

The starch esters prepared by the method described herein have a DS or degree of substitution of about 0.5 to 1.8. The term "degree of substitution" or "DS" as used herein indicates the average number of sites per anhydroglucose unit of the starch molecule on which there are substituent groups.

Temperature and pH are directly related to the reaction time and upper limits will be determined by the nature of the ester substituent and its stability at any given set conditions. The desired temperature range is from about 0° to 40° C., preferably 5° to 20° C. The pH range will vary from about 7 to 11, preferably from about 7.5 to 10 and most preferably from abut 7.8 to 8.5.

Since the temperature and pH directly affect the rate of reaction, they will therefore affect the rate of addition of the anhydride. The actual rates of addition have little effect on the overall efficiency of the reaction, but will impact on the amount of heat generated. Any rate of addition in which the temperature and pH can be controlled within the preferred ranges will produce acceptable results. In general, the rate of addition will be from about 2 to 8 hours for 100 percent anhydride treatment, by weight of starch dry basis, and preferably about 4 hours.

As noted earlier, various starch esters including mixed starch esters, i.e., acetate/propionate or acetate/butyrate, can be prepared by the method of this invention. In preparing the mixed esters different treatment procedures can be used. In one procedure, the starch is treated with one anhydride followed by treatment with a second anhydride. Using this method it is preferred that the first treatment be made with the anhydride with the highest molecular weight (longest chain length). Longer chain esters are known to be more stable toward hydrolysis and will better survive the second treatment and give better reaction efficiencies.

Another procedure for producing the mixed esters is to utilize a single treatment with a mixture of anhydrides. The ratio of the anhydride in the mixture would determine the ratio of esters on the final product.

A third procedure for producing the mixed esters is to use a mixed anhydride. Methods for preparing mixed anhydrides are well known in the art. The ratio of esters bound on the final product will depend on the reactivity of each moiety of the anhydride, with lower alkyl chains being more reactive than longer chains.

The first method involving multiple or subsequent treatments with different anhydrides is preferred because of the ease of control in making and isolating different products of different ratios.

The following examples will further illustrate the embodiments of this invention. In these examples, all parts are given by weight and all temperatures in degrees Celsius unless otherwise noted.

EXAMPLE I

Several starch esters prepared with propionic anhydride and having different degrees of substitution (DS) were prepared in the following manner.

A lab scale reactor was constructed from a five gallon plastic bucket and a cooling coil fabricated from five meters of ¼ inch copper tubing and coiled to fit into the bucket with a one inch wall clearance. Cold water was pumped through the coil as needed to keep the reaction media at the prescribed temperature. An overhead motor was equipped with a two inch propeller type stirrer at the end of the stirrer shaft and a two inch turbine about six inches above the propeller. Plastic inlet tubes with a two mm inside diameter were placed ⅛ inch above opposing corners of the propeller blade. One inlet was connected to the reagent pump while the other, feeding 25% sodium hydroxide, was connected to the caustic pump with each being at least one inch below the starting water level to insure adequate mixing.

The reaction was charged with five liters of water and 2.5 kilograms of starch. Once a uniform slurry was obtained, the pH of the reactor mix was adjusted to 8.0 by initiating the caustic pump and pH controller (pH can be controlled manually if desired) . The temperature was lowered to 10°–15° C. by adjusting the flow of cooling water. Once the proper temperature was reached, the flow of anhydride was started. The anhydride or reagent pump was calibrated to deliver the total charge in four hours. The caustic or pH control pump was set to automatic and the flow of cooling water increased to account for the exothermic reaction.

The reaction was complete when all the anhydride had been added, the pH stabilized and the consumption of caustic stopped. At this point the pH of the reaction was adjusted to 6.0 with HCl. The starch was filtered and residual material removed by washing the filter cake with about three additional 5-liter volumes of water. The final product was air dried to less than 15 percent moisture before being packaged. Table 1 gives the results with various starches and shows the DS for each prepared starch ester.

TABLE 1

| STARCH TYPE | ANHYDRIDE TREATMENT (WT % BASED ON STARCH) | DS |
|---|---|---|
| Hylon ® VII Starch[1,2] | 100 | 1.15 |
| Hylon VII Starch | 200 | 1.57 |
| Hylon VII Flour | 100 | 0.78 |
| Corn | 100 | 0.87 |
| Waxy Maize | 100 | 1.00 |
| Hylon VII (Acid Hydrolyzed) | 100 | 1.01 |
| Waxy Maize (Acid Hydrolyzed) | 100 | 0.86 |
| Corn (Acid Hydrolyzed) | 100 | 0.92 |
| Nadex ® 360 Dextrin[1] (White Dextrin) | 100 | 0.86 |
| Nadex 772 Dextrin (Canary Dextrin) | 100 | 0.75 |

[1] Hylon and Nadex are products of National Starch and Chemical Company.
[2] Hylon VII is a high amylose corn starch having about 70% amylose content.

EXAMPLE II

This example illustrates the preparation of starch acetates by reaction of acetic anhydride with starch under aqueous conditions. The procedure described in Example I was followed with acetic anhydride used in place of propionic anhydride. A slightly greater exotherm was detected in the acetic anhydride reaction and under some extreme conditions may require additional cooling to maintain the reaction temperature (described above). Table 2 shows the results with various starches and demonstrates that samples with DS of about 0.7 to 1.7 were produced by this procedure.

TABLE 2

| STARCH TYPE | ANHYDRIDE TREATMENT (WT % BASED ON STARCH) | DS |
|---|---|---|
| Corn | 100 | 0.74 |
| Hylon VII Starch | 100 | 1.05 |
| Hylon VII Starch | 200 | 1.71 |
| Hylon VII Starch (Acid Hydrolyzed) | 100 | 0.83 |
| Waxy Maize | 100 | 0.93 |

EXAMPLE III

Another starch ester was prepared in a manner similar to Example I using butyric anhydride in place of propionic anhydride. Using Hylon VII starch with a 100% treatment level of butyric anhydride, a starch ester having a DS of 1.01 was prepared.

EXAMPLE IV

This example describes the preparation of mixed esters by reaction of two different anhydrides with the starch. The method and conditions for the reaction are described in Example I. After addition of the first anhydride, the reaction was allowed to come to stable pH (as described in Example I) and then the second anhydride was added without the need for isolation of the intermediate product. A small aliquot of sample can be taken before the addition of the second anhydride for analytical purposes. Table 3 shows the usefulness of this procedure for making a variety of derivatized starches.

TABLE 3

| STARCH TYPE | ANHYDRIDE TREATMENT (WT % BASED ON STARCH) | | DS |
|---|---|---|---|
| | TREATMENT 1 | TREATMENT 2 | |
| Hylon VII Starch | 20% Propionic | 80% Acetic | 0.95 |
| Hylon VII Starch | 50% Propionic | 50% Acetic | 1.05 |
| Hylon VII Starch | 20% Propionic | 80% Acetic | 0.94 |
| Hylon VII Starch (Acid Hydrolyzed) | 20% Propionic | 80% Acetic | 0.94 |
| Corn Starch | 20% Propionic | 80% Acetic | 0.79 |
| Waxy Maize (Acid Hydrolyzed) | 20% Propionic | 80% Acetic | 0.69 |
| Corn Starch (Acid Hydrolyzed) | 20% Propionic | 80% Acetic | 0.78 |

EXAMPLE V

A dispersed, non-granular starch ester was prepared in the following manner. In some cases the starting starch was modified by initially pretreating with 10% by weight acetic anhydride to provide a modified starch with a DS of about 0.1 to avoid retrogradation. The modified starch was then jet cooked at 300° F. to thoroughly disrupt the granular starch. The dispersion was then adjusted to 17 percent solids and cooled to 15° C. The reaction was then accomplished using the procedure as described in Example I. The products were precipitated from solution after about 70% anhydride treatment. The remaining anhydride was added and the final product was filtered and washed with water to remove salt by-products. The results of various prepared starch esters are summarized in Table 4 and illustrate the utility of this procedure for making non-granular starch esters with DS's ranging from about 0.6 to 1.6.

TABLE 4

| Starch Type | Pretreatment | Anhydride Treatment | DS |
|---|---|---|---|
| Corn Starch | none | 100% Propionic | 0.89 |
| Corn Starch | none | 200% Propionic | 1.43 |
| Waxy Maize | none | 100% Propionic | 0.63 |
| Hylon VII Starch | 10% Acetic | 100% Propionic | 1.21 |
| Hylon VII Starch | 10% Acetic | 100% Propionic | 1.54 |
| Hylon VII Starch | 10% Acetic | 200% Propionic | 1.54 |
| Hylon VII Starch | 10% Acetic | 100% Acetic | 1.10 |
| Hylon VII Starch | 10% Acetic | 200% Acetic | 1.29 |

EXAMPLE VI

A starch propionate was prepared using the procedure described in Example I except 25% aqueous potassium hydroxide was used to control the pH instead of sodium hydroxide. A 100% treatment of propionic anhydride onto Hylon VII starch produced a product with a DS of 0.92.

EXAMPLE VII

A starch propionate was prepared using the procedure described in Example I except that a 25% slurry of calcium hydroxide was used to control the pH instead of sodium hydroxide. Constant agitation of the calcium hydroxide holding tank was necessary to prevent settling. A 100% treatment of propionic anhydride onto Hylon VII starch afforded a DS of 0.86.

We claim:

1. A method of preparing a starch ester having a DS of from about 0.5 to 1.8 in a one step aqueous process wherein from about 35 to 300% by weight of an organic acid anhydride, based on the dry weight of starch, is reacted with starch in aqueous alkali at a pH of from about 7 to 11 and at a temperature of from abut 0° to 40° C., wherein the pH is controlled by the addition of aqueous alkali having a concentration of about 10 to 50% by weight.

2. The method of claim 1 wherein the alkali comprises an alkali metal hydroxide.

3. The method of claim 2 wherein the starch is a granular starch.

4. The method of claim 2 wherein the starch is a non-granular starch.

5. The method of claim 2 wherein the alkali metal hydroxide is sodium hydroxide.

6. The method of claim 2 wherein from about 50 to 200% by weight of organic acid anhydride is used.

7. The method of claim 6 wherein the alkali metal hydroxide is sodium hydroxide.

8. The method of claim 7 wherein the sodium hydroxide is used in a concentration of about 20 to 30% by weight.

9. The method of claim 1 wherein the starch ester is a compound having the formula:

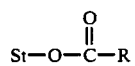

where St is the starch base material and R is an alkyl group having 1 to 7 carbon atoms.

10. The method of claim 9 wherein the alkali comprises an alkali metal hydroxide having a concentration of about 10 to 50% by weight.

11. The method of claim 10 wherein the ester is an acetate or a propionate.

12. The method of claim 10 wherein the ester compound is a mixed starch ester of acetate and propionate.

13. The method of claim 10 wherein from about 50 to 200% by weight of organic acid anhydride is used.

14. The method of claim 13 wherein the starch base material is a granular starch.

15. The method of claim 13 wherein the starch base material is a dispersed starch.

16. The method of claim 10 wherein the starch base material is high amylose starch.

17. The method of claim 10 wherein the R group is an alkyl group of 1 to 4 carbon atoms.

18. The method of claim 17 wherein the ester is an acetate or propionate and the alkali metal hydroxide is sodium hydroxide.

19. The method of claim 18 wherein the ester compound is a mixed starch ester of acetate and propionate and the alkali metal hydroxide is sodium hydroxide.

20. A starch ester having a DS of about 0.5 to 1.8 and prepared by the method of claim 1.

21. A flour ester composition having a DS of about 0.5 to 1.8 and having the formula:

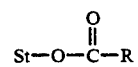

where St is flour base material and R is an alkyl group having 1 to 7 carbon atoms.

22. The composition of claim 21 wherein R is an alkyl group of 1 to 4 carbon atoms.

* * * * *